United States Patent
Arai

(10) Patent No.: US 10,898,808 B2
(45) Date of Patent: *Jan. 26, 2021

(54) GAME PROGRAM, GAME CONTROL METHOD, AND COMPUTER

(71) Applicant: GREE, Inc., Tokyo (JP)

(72) Inventor: Hidenobu Arai, Tokyo (JP)

(73) Assignee: GREE, Inc., Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 16/210,265

(22) Filed: Dec. 5, 2018

(65) Prior Publication Data

US 2019/0105569 A1    Apr. 11, 2019

Related U.S. Application Data

(63) Continuation of application No. 14/948,671, filed on Nov. 23, 2015, now Pat. No. 10,183,221.

(30) Foreign Application Priority Data

Nov. 28, 2014 (JP) .................................. 2014-242471

(51) Int. Cl.
  *A63F 13/533* (2014.01)
  *A63F 13/69* (2014.01)
  (Continued)

(52) U.S. Cl.
  CPC .............. *A63F 13/55* (2014.09); *A63F 13/30* (2014.09); *A63F 13/69* (2014.09); *A63F 13/795* (2014.09);
  (Continued)

(58) Field of Classification Search
  None
  See application file for complete search history.

(56) References Cited

U.S. PATENT DOCUMENTS

2004/0224741 A1   11/2004  Jen et al.
2007/0225071 A1*   9/2007  Van Luchene ........ A63F 13/822
                                                          463/29
(Continued)

FOREIGN PATENT DOCUMENTS

JP    2002-306851 A    10/2002
JP    2008-194314 A     8/2008
(Continued)

OTHER PUBLICATIONS

Machine English Translation of JP Pub. 2014-136022. (Year: 2014).*
(Continued)

*Primary Examiner* — Damon J Pierce
(74) *Attorney, Agent, or Firm* — Maier & Maier, PLLC

(57) ABSTRACT

A computer-implemented method for operating a computer game. It can include identifying a playing user and one or more other users; storing user information about one or more other users and the game progress information of those other users; determining whether any of the other users satisfy a predetermined condition based on their game progress information; identifying any of the other users that meet the condition and qualify as substitution-target users; displaying the substitution-target users to the playing user; obtaining input from a playing user indicating the selection of at least one substitution-target user; allowing the user to play the game, and obtaining a result of a game played by a playing user on behalf of a substitution-target user, with said game being one available to the substitution-target user; and updating the game progress information of the substitution-target user in accordance with the result of that game.

20 Claims, 8 Drawing Sheets

(51) Int. Cl.
*A63F 13/798* (2014.01)
*A63F 13/55* (2014.01)
*A63F 13/795* (2014.01)
*A63F 13/30* (2014.01)
*A63F 13/79* (2014.01)

(52) U.S. Cl.
CPC .......... *A63F 13/798* (2014.09); *A63F 13/533* (2014.09); *A63F 13/79* (2014.09)

(56) References Cited

U.S. PATENT DOCUMENTS

| | | | |
|---|---|---|---|
| 2011/0118033 A1* | 5/2011 | Fiedler | A63F 13/34 463/42 |
| 2013/0084985 A1 | 4/2013 | Green et al. | |
| 2013/0252742 A1 | 9/2013 | Shimono et al. | |
| 2014/0289034 A1* | 9/2014 | Wu | G06Q 30/0231 705/14.31 |
| 2014/0357352 A1 | 12/2014 | Van Luchene | |

FOREIGN PATENT DOCUMENTS

| | | |
|---|---|---|
| JP | 2010-042083 A | 2/2010 |
| JP | 2013-128583 A | 7/2013 |
| JP | 2013-226223 A | 11/2013 |
| JP | 2014-136022 A | 7/2014 |
| JP | 2014-150848 A | 8/2014 |

OTHER PUBLICATIONS

Tenka Toitsu Chronicle, Monthly Applistyle vol. 1, No. 4, Eastpress, pp. 096 and 097, Published: May 23, 2013; 6 pages.
Japanese Office Action dated Jan. 20, 2015 in corresponding Japanese Application No. 2014-242471; 5 pgs.
Japanese Office Action dated Jun. 16, 2015 in corresponding Japanese Application No. 2015-096099; 6 pgs.
Japanese Office Action dated Feb. 7, 2017 in corresponding Japanese Application No. 2015-192563; 9 pgs.
Japanese Office Action dated Sep. 26, 2017 in corresponding Japanese Application No. 2015-192563; 12 pgs., including English translation.
Office Action dated Jun. 4, 2019, in corresponding Japanese Application No. 2018-105621; 11 pages.
Office Action dated Dec. 24, 2019, in corresponding Japanese Application No. 2018-105621; 10 pages.

* cited by examiner

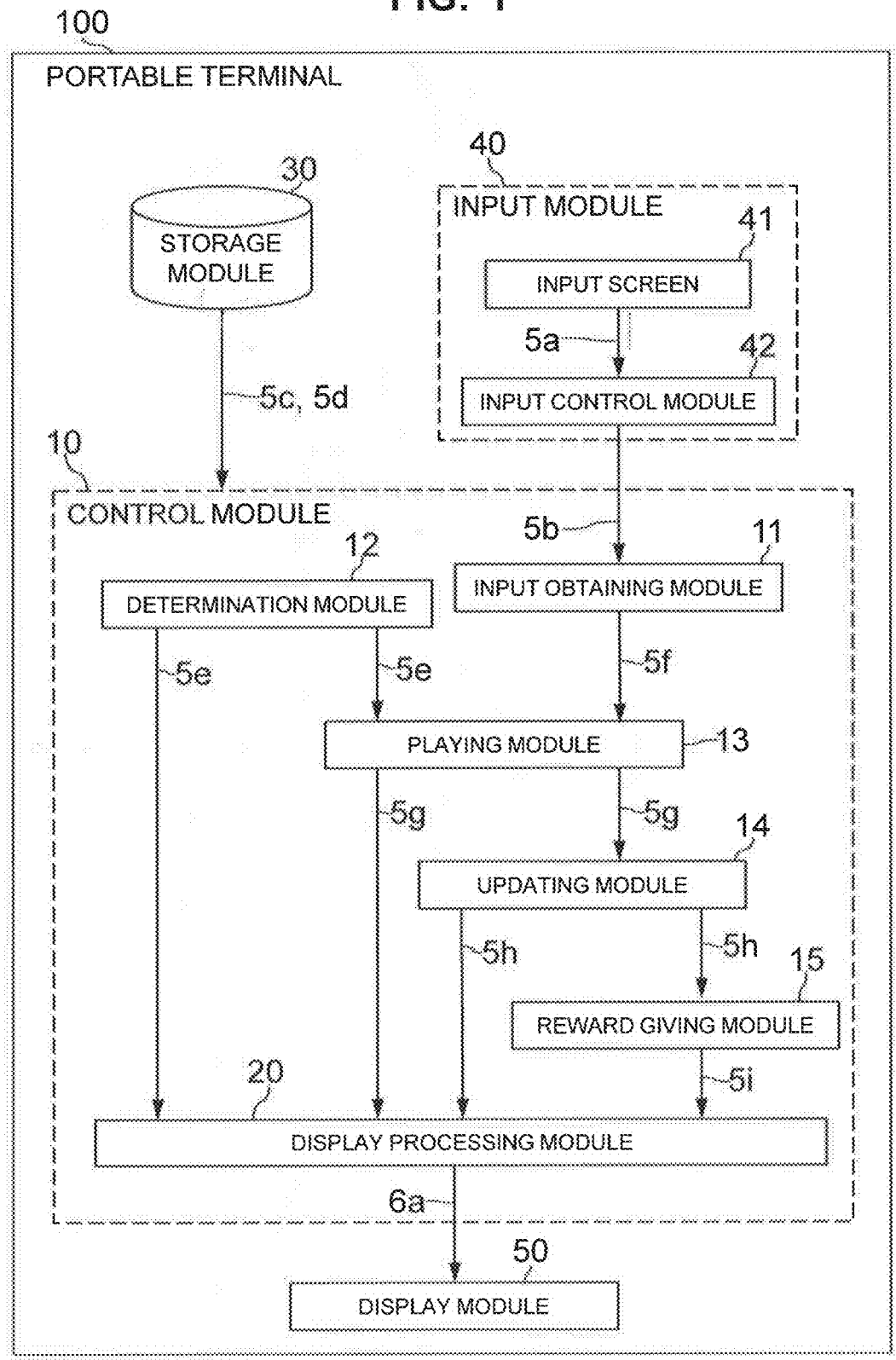

FIG. 4A

Substitution-target users / Non-substitution-target users

| | | Keisuke<br>Mission 11, Target fish A caught: 60 | Help |
| | | Tadamasa<br>Mission 8, Target fish C caught: 23 | Help |
| | | Hirokazu<br>Mission 25, Target fish E caught: 90 | Help |
| | | Hikaru<br>Mission 35, Target fish E caught: 100 | Help |
| | | Koshiro<br>Mission 20, Target fish E caught: 72 | Help |
| | | Yuka<br>Mission 26, Target fish A caught: 120 | Help |
| | | Keitaro<br>Mission 18, Target fish C caught: 32 | Help |
| | | Masahiro<br>Mission 22, Target fish B caught: 15 | Help |

FIG. 4B

Substitution-target users / Non-substitution-target users

| | | Keisuke<br>Mission 11, Target fish A caught: 60 | Help |
| | | Tadamasa<br>Mission 8, Target fish C caught: 23 | Help |
| | | Koshiro<br>Mission 20, Target fish E caught: 72 | Help |
| | | Hirokazu<br>Mission 25, Target fish E caught: 90 | Help |
| | | Ryuga<br>Mission 35, Target fish E caught: 305 | |
| | | Fukiko<br>Mission 33, Target fish E caught: 325 | |
| | | Risa<br>Mission 34, Target fish D caught: 300 | |
| | | Sho<br>Mission 31, Target fish A caught: 295 | |

FIG. 6

| MISSION LEVEL | TYPE OF TARGET FISH | NUMBER OF TARGET FISH TO BE CAUGHT TO CLEAR MISSION |
|---|---|---|
| 1 | TARGET FISH A | 3 |
| 2 | TARGET FISH A | 5 |
| 3 | TARGET FISH B | 3 |
| 4 | TARGET FISH B | 5 |
| 5 | TARGET FISH C | 7 |
| 6 | TARGET FISH A | 12 |
| 7 | TARGET FISH B | 20 |
| 8 | TARGET FISH C | 25 |
| 9 | TARGET FISH C | 45 |
| 10 | TARGET FISH D | 25 |
| 11 | TARGET FISH A | 65 |
| 12 | TARGET FISH B | 65 |
| 13 | TARGET FISH C | 95 |
| 14 | TARGET FISH D | 70 |
| 15 | TARGET FISH E | 40 |
| 16 | TARGET FISH A | 110 |
| 17 | TARGET FISH B | 100 |
| 18 | TARGET FISH C | 150 |
| 19 | TARGET FISH D | 105 |
| 20 | TARGET FISH E | 90 |
| 21 | TARGET FISH A | 155 |
| 22 | TARGET FISH B | 155 |
| 23 | TARGET FISH C | 180 |
| 24 | TARGET FISH D | 160 |
| 25 | TARGET FISH E | 150 |
| 26 | TARGET FISH A | 220 |
| 27 | TARGET FISH B | 220 |
| 28 | TARGET FISH C | 250 |
| 29 | TARGET FISH D | 225 |
| 30 | TARGET FISH E | 225 |
| 31 | TARGET FISH A | 295 |
| 32 | TARGET FISH B | 295 |
| 33 | TARGET FISH C | 325 |
| 34 | TARGET FISH D | 300 |
| 35 | TARGET FISH E | 305 |

GAME PROGRAM, GAME CONTROL METHOD, AND COMPUTER

CLAIM OF PRIORITY

This application claims priority from U.S. patent application Ser. No. 14/948,671, filed on Nov. 23, 2015, entitled "GAME PROGRAM, GAME CONTROL METHOD, AND COMPUTER," which in turn claims priority from Japanese Patent Application No. 2014-242471, filed on Nov. 28, 2014, the entire contents of which are hereby incorporated by reference.

BACKGROUND

Social games that a user plays cooperatively with a plurality of other users are becoming popular.

For example, Japanese Unexamined Patent Application Publication No. 2014-150848 discloses a game system that makes a plurality of players cooperate with one another upon the occurrence of an event, determines whether each of the positions of the player objects of the respective players before the occurrence of the event is superior or inferior to others, and positions a joint object in accordance with the result of determination. According to Japanese Unexamined Patent Application Publication No. 2014-150848, a skilled player can bring up the level of an unskilled player, and the players can enjoy a cooperative game that offers a sense of unity.

Although Japanese Unexamined Patent Application Publication No. 2014-150848 states that a skilled player brings up the level of an unskilled player in the game disclosed therein, the game is configured to proceed as a user (player) plays the game in cooperation with other users and does not focus on making the user (player) play the game on behalf of "other users".

SUMMARY

According to an exemplary embodiment, a game configured to give a strong incentive to a user (player) to help other users that have made little progress in the game may be described. Such a game may be used to maintain and increase the motivation of those other users that have made little progress in the game, which may in turn keep them playing the game despite such lack of progress. According to such an embodiment, a game program may cause a computer to implement a storage function that may store, in a storage module, user information about one or more other users and game progress information about progress in a game made by the other users in association with each other; a determination function that may determine whether the other users satisfy a predetermined condition on the basis of the game progress information relating to the other users; a display function that may output display information that may be used to display, on a terminal apparatus of a user (player), one or more users among the other users, the one or more users having been determined by the determination function to satisfy the predetermined condition, as substitution-target users for which the user (player) is to substitute and to play the game played by the one or more users, and the player further being able to select one or more of these users; an input obtaining function that may obtain selection information about a substitution-target user input by the user (player); a playing function allowing a user (player) to play the game based on the game progress information relating to the substitution-target user on behalf of the substitution-target user in accordance with the selection information obtained by the input obtaining function; and an updating function that may update the game progress information relating to the substitution-target user in accordance with a result of the game played via the playing function.

Multiple configurations for said game program are possible. Specifically, the game program may be implemented such that (a) the computer functions as a client apparatus (smartphone or personal computer, for example), and the game program is executed on the client apparatus, (b) the computer functions as a server apparatus (mainframe, cluster computer, or any computer capable of providing a game service to an external apparatus, for example), part or all of the game program is executed on the server apparatus, and the result of a process performed by the server apparatus executing the game program is returned to the client apparatus, or (c) the client apparatus and the server apparatus perform respective portions of a process related to the game program as desired.

According to some exemplary embodiments, the display function implemented by the game program may (a) output the display information to an external display device (display module included in a portable terminal, for example) which is connected to the computer via a certain network (the Internet, for example) so as to enable communication to thereby display a game screen on the display device, or (b) output the display information to a display device included in the computer to thereby display a game screen on the display device.

Other exemplary embodiments may include (a) a client apparatus that is connected to the computer via a certain network (the Internet, for example) so as to enable communication may include an input device, the client apparatus transmits the selection information (operation information) input via the input device to the computer, and the input obtaining function implemented on the computer by the game program may obtain (receive) the selection information (operation information), or (b) the computer may include the input device, and the input obtaining function may obtain the selection information (operation information) via the input device.

According to some exemplary embodiments, one predetermined condition that may be satisfied by a user may be the condition that game progress information relating to the user is available to other users, but that the game progress information relating to a user among the other users does not include information indicating that the game played by the user among the other users has reached a predetermined state or progress milestone; for example, the game progress information may not include an indication that a user has reached a particular level.

According to another exemplary embodiment, the predetermined condition may be a condition that the game progress information relating to a user among the other users includes information indicating a request made by the user among the other users to the user (player) to play the game based on the game progress information relating to the user among the other users on behalf of the user among the other users; for example, a user may be able to specifically request that a player aid them in completing a particular level.

According to one exemplary embodiment of a game program, it may be configured to cause a computer to further implement a reward giving function of giving a predetermined reward to the user (player) in a case where the user (player) is made to play the game based on the game progress information relating to the substitution-target user on behalf of the substitution-target user. According to a second embodiment, such user information about the other users may include classification information about the other users, and the reward giving function may vary the predetermined reward in accordance with the classification information about the substitution-target user.

According to an exemplary embodiment, the user information about each user among the other users may include information about a registration date on which the user among the other users performed player registration for the game, and the classification information about each user among the other users may include information indicating whether the user among the other users is a new user for which the registration date of the user among the other users is within a predetermined period from the present time.

According to an exemplary embodiment, the user information about each user among the other users may include information about a last logged-in date on which the user among the other users last logged in to the game, and the classification information about each user among the other users may include information indicating whether the user among the other users is an inactive user for which the last logged-in date of the user among the other users is outside of a predetermined period from the present time.

According to an exemplary embodiment, the classification information about each user among the other users may include information indicating whether the user among the other users is a friend user for which the user information about the user among the other users is stored by the storing function in association with the user (player).

According to an exemplary embodiment, the display function may output display information for displaying, on the terminal apparatus of the user (player), one or more users among the other users, the one or more users having been determined to not satisfy the predetermined condition, so as to be distinguishable from the one or more users among the other users which have been determined to satisfy the predetermined condition and so as to be selectable.

An exemplary embodiment of a game control method that may be structured to address the above issue may include a storage step of storing, in a storage module, user information about one or more other users and game progress information about progress in a game made by the other users in association with each other; a determination step of determining whether the other users satisfy a predetermined condition on the basis of the game progress information relating to the other users; a display step of outputting display information for displaying, on a terminal apparatus of a user (player) so as to be selectable, one or more users among the other users, the one or more users having been determined in the determination step to satisfy the predetermined condition, as substitution-target users for which the user (player) is to substitute and to play the game played by the one or more users; an input obtaining step of obtaining selection information about a substitution-target user input by the user (player); a playing step of making the user (player) play the game based on the game progress information relating to the substitution-target user on behalf of the substitution-target user in accordance with the selection information obtained in the input obtaining step; and an updating step of updating the game progress information relating to the substitution-target user in accordance with a result of the game played in the playing step.

An exemplary embodiment of a computer may include a storage module that stores therein user information about one or more other users and game progress information about progress in a game made by the other users in association with each other; a determination module that determines whether the other users satisfy a predetermined condition on the basis of the game progress information relating to the other users; a display module that outputs display information for displaying, on a terminal apparatus of a user (player) so as to be selectable, one or more users among the other users, the one or more users having been determined by the determination module to satisfy the predetermined condition, as substitution-target users for which the user (player) is to substitute and to play the game played by the one or more users; an input obtaining module that obtains selection information about a substitution-target user input by the user (player); a playing module that makes the user (player) play the game based on the game progress information relating to the substitution-target user on behalf of the substitution-target user in accordance with the selection information obtained by the input obtaining module; and an updating module that updates the game progress information relating to the substitution-target user in accordance with a result of the game played via the playing module.

According to an exemplary embodiment of the game program, the game control method, and/or the computer, a user (player) may be made to play the game based on game progress information relating to a user (substitution-target user) among other users which may be determined to satisfy a predetermined condition on behalf of the substitution-target user, and the game progress information relating to the substitution-target user may be updated in accordance with the result of the game played by the user (player). Accordingly, an effect of maintaining and increasing the motivation of the "other users" that have made little progress in the game to continuously play the game can be produced.

BRIEF DESCRIPTION OF THE DRAWINGS

FIG. 1 is a block diagram illustrating an exemplary embodiment of a configuration of principal parts of a portable terminal according to a first embodiment of the present invention.

FIGS. 2A to 2D further illustrate that a user (player) may undertake a mission that is uncompleted by the selected substitution-target user and may make the mission progress (plays the game), which may cause the result to be shown on a screen.

FIGS. 4A and 4B illustrate exemplary embodiments of screens on which "substitution-target users" that are determined to satisfy a predetermined condition and "non-substitution-target users" that are determined to not satisfy the predetermined condition may be displayed so as to be distinguishable from each other and so as to be selectable or nonselectable where applicable.

FIG. 6 is an exemplary embodiment of a table illustrating the type and the number of fish required to be caught in order to complete a mission at each level in accordance with the mission level on a step-by-step basis.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Referring generally to FIGS. 1-7, an exemplary embodiment of a configuration in which a computer functions as a portable terminal (client apparatus), and a game program according to an aspect of the present invention is executed on the portable terminal as a so-called native application (native game), may be described.

Figure 8:
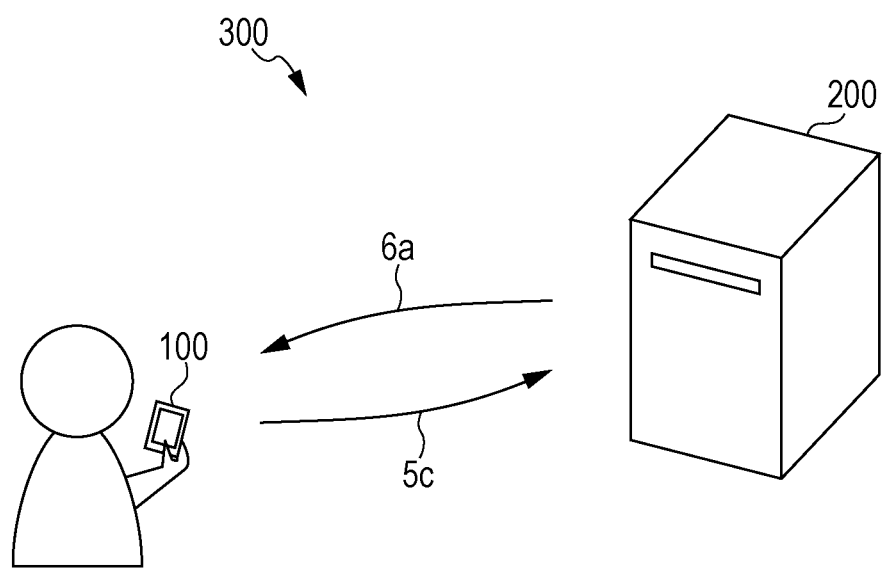
FIG. 8 is a schematic diagram illustrating an exemplary embodiment of a configuration of a game system including a portable terminal and a server apparatus.

Referring now to FIG. 8, an exemplary embodiment in which a computer may function as a server apparatus, part or all of the game program according to an aspect of the present invention may be executed on the server apparatus as a so-called Web application (Web game), and the result of a process performed by the server apparatus executing the game program may be returned to the portable terminal, may be described.

An exemplary embodiment of a client apparatus and native game may be described. Again referring generally to FIGS. 1-7, an exemplary embodiment of a configuration in which a computer functions as a portable terminal (client apparatus), and a game program according to an aspect of the present invention is executed on the portable terminal as a so-called native application (native game), may be described as follows.

According to an exemplary embodiment of a game, such a game may proceed by permitting a user to advance the progress of one or more missions. According to such an embodiment, in one such mission, a "user having an advantage over others" and a "user not having an advantage over others" may both be present for a certain mission.

Here, a "user having an advantage over others" may be a user that has made relatively satisfactory progress in a certain mission. A "user not having an advantage over others" may be a user that has made little progress in a certain mission.

A relation between a "user having an advantage over others" and a "user not having an advantage over others" is not limited to a specific relation as long as there is a certain difference in the mission progress level between the users, and examples of the relation include (1) a relation between a "skilled user" and a "new user", (2) a relation between a "user having a specific item" and a "user not having a specific item", (3) a relation between a "user having a specific attribute" and a "user not having a specific attribute", and (4) a relation between a "user having sufficient time for making progress in a mission" and a "user not having sufficient time for making progress in a mission". Other such examples of the relation may also be envisioned.

According to such an embodiment, for a "user not having an advantage over others for a certain mission (another user that has made little progress in a certain mission)", it may be possible to boost the motivation of a "user having an advantage over others (a user that has made relatively satisfactory progress in the certain mission)" to help the "user not having an advantage over others" by giving a "specific incentive" to do so.

For example, according to one such embodiment, a particular user (the "other user") may lose his/her motivation for playing the game when he/she has failed to make progress in a certain mission. However, another user (the player) may perform some action to make the mission that is uncompleted by the other user progress, which may in turn allow the other user to proceed to the next new mission. Accordingly, it is possible to strengthen the other user's motivation for playing the game, which has been lost, and to maintain and increase the motivation of the other user to continuously play the game.

According to one exemplary embodiment, the user (player) "helping" another user that has made little progress in a certain mission may constitute the user (player) undertaking the rest of the uncompleted mission and making the uncompleted mission progress (playing the game) on behalf of the other user that has made little progress.

According to an exemplary embodiment, a "specific incentive" given to the user (player) may be any of a variety of appropriate incentives. For example, the specific incentive may be an incentive that boosts the user (player)'s motivation for helping a "user not having an advantage over others (another user that has made little progress in a certain mission)".

Examples of a "specific incentive" which may be given to a user (player) may include (i) a "predetermined reward" which is given to the user (player) when the user (player) helps a "user not having an advantage over others", and (ii) the possibility of a "predetermined reward" to be given to the user (player) which is increased when the user (player) helps a "user not having an advantage over others".

Other examples of a "specific incentive" which may be given to a user (player) may include (i) a "predetermined reward" which is given to a group to which the user (player) belongs when the user (player) helps a "user not having an advantage over others", and (ii) the possibility of a "predetermined reward" to be given to a group to which the user (player) belongs which is increased when the user (player) helps a "user not having an advantage over others". For example, in a case where the user (player) is joining a battle between groups, a "user not having an advantage over others" that is a member of a group to which the user (player) belongs and that has made little progress in a certain mission negatively affects the group trying to win the battle. When the user (player) helps the "user not having an advantage over others" to make the mission of the "user not having an advantage over others" progress, the possibility of the group winning the battle is increased. As a result, (i) a "predetermined reward" can be given to the user (player)

and/or to the group to which the user (player) belongs, or (ii) the possibility of a "predetermined reward" to be given to the user (player) and/or to the group to which the user (player) belongs can be increased.

Here, a "predetermined reward" that is given to the user (player) may be a reward in a form of a game content such as an item presented to the user (player) or may be a reward in a form of an effect of promoting progress in the game played by the user (player) or an effect of giving an advantage to the user (player) playing the game.

Note that a "game content" may be any electronic data used by the player in the game implemented by the game program according to this embodiment and/or in other games implemented by other game programs. According to an exemplary embodiment, a "game content" may be an in-game unlockable such as an in-game item or character, an out-of-game unlockable such as an item or character for another game implemented by another game program, or may be any other similar reward, as desired.

Configuration of a Portable Terminal

FIG. 1 depicts a block diagram illustrating an exemplary embodiment of a configuration of principal parts of a portable terminal 100. The portable terminal (gaming computer) 100 may be an information processing apparatus capable of executing the game program according to this embodiment. Note that the information processing apparatus may be any device capable of performing a process related to the game program, is not limited to the portable terminal 100, and may be implemented by using a smartphone, a tablet terminal, a portable telephone (feature phone), a home video game machine, a personal computer, or other electronic devices. Note that the game program can be preferably executed on a multifunction device (smartphone, for example) that includes a display (display module), an input screen capable of detecting touch input, a memory, and one or more processors capable of executing one or more programs stored in the memory.

As illustrated in exemplary FIG. 1, the portable terminal 100 may include a control module 10, which may in turn include an input obtaining module 11, a determination module 12, a playing module 13, an updating module 14, a reward giving module 15, and a display processing module 20. The portable terminal 100 may also include an input module 40, including an input screen 41 and an input control module 42, as well as a display module 50, and a storage module 30. Note that "display module (display function)" defined in the appended claims corresponds to the "display processing module 20" in FIG. 1.

According to an exemplary embodiment, a control module 10 may entirely control various functions of the portable terminal 100. The control module 10 may include the input obtaining module 11, the determination module 12, the playing module 13, the updating module 14, the reward giving module 15, and the display processing module 20.

An input module 40 may be configured to accept an operation performed by the user (player). According to one exemplary embodiment, the input module 40 may be a touch panel, and may accept input via touch operation. The input module 40 may include the input screen 41 and the input control module 42. According to an exemplary embodiment, either or both components of an input module 40 may accept input to a portable terminal 100; for example, input may be provided by a touch operation using the touch panel, and may also be provided by pressing a certain input key.

The input screen 41 may be a device configured to detect a position specified by the player performing an operation; for example, this may be a touch screen. The input screen 41 outputs a touch signal 5a that corresponds to the specified position to the input control module 42.

The input control module 42 may be configured to generate coordinate information 5b that may include information about coordinates on the input screen 41 on the basis of the touch signal 5a input from the input screen 41. The input control module 42 may output the coordinate information 5b to the input obtaining module 11.

The storage module (storage function) 30 may store user information 5c about one or more other users and game progress information 5d about progress in the game made by the other users in association with each other. Storage module 30 may be a separate device or module, or may be a subsystem on which a storage function is running, as desired.

The user information 5c and the game progress information 5d output from the storage module 30 may be input to the determination module 12.

The determination module (determination function) 12 may determine whether the other users satisfy a predetermined condition on the basis of the game progress information 5d relating to the other users. Determination module 12 may be a separate device or module, or may be a subsystem on which a determination function is running, as desired.

Determination information 5e output from the determination module 12 is input to the playing module 13 or the display processing module 20.

The display processing module (display function) 20 may be configured to output display information (screen information) 6a for displaying, on the terminal apparatus of the user (player) so as to be selectable, one or more users among the other users, the one or more users having been determined by the determination module 12 to satisfy the predetermined condition, as substitution-target users for which the user (player) is to substitute and to play the game played by the one or more users.

The display processing module (display function) 20 can output the display information (screen information) 6a for displaying, on the terminal apparatus of the user (player), one or more users among the other users, the one or more users having been determined to not satisfy the predetermined condition, so as to be distinguishable from the one or more users among the other users which have been determined to satisfy the predetermined condition and so as to be selectable.

The display information (screen information) 6a output from the display processing module 20 may be input to the display module 50.

The input obtaining module (input obtaining function) 11 may obtain selection information 5f about a substitution-target user input by the user (player).

The selection information 5f output from the input obtaining module 11 may be input to the playing module 13.

The playing module (playing function) 13 may permit a user (player) to play a game, and may provide updates or information to the game as the user (player) plays it. Such information may include, for example, game progress information 5g relating to the substitution-target user, which may be provided on behalf of the substitution-target user in accordance with the selection information 5f obtained by the input obtaining module (input obtaining function) 11.

The game progress information 5g relating to the substitution-target user output from the playing module 13 may be input to the updating module 14 or the display processing module 20.

The updating module (updating function) 14 may update the game progress information 5g relating to the substitution-target user in accordance with the result of the game played via the playing module 13.

Update information 5*h* output from the updating module 14 may be input to the reward giving module 15 or the display processing module 20.

The reward giving module (reward giving function) 15 may be configured to give a predetermined reward to the user (player) in a case where the playing module 13 permits a user (player) to play the game, based on the game progress information 5*g* relating to the substitution-target user on behalf of the substitution-target user.

Reward giving information 5*i* output from the reward giving module 15 may be input to the display processing module 20.

The display processing module 20 may generate display information 6*a* or screen information about a game screen, which may then be shown to a user (player). This screen may be generated by processing of various data inputs, for example the determination information 5*e* input from the determination module 12, the game progress information 5*g* relating to the substitution-target user input from the playing module 13, the update information 5*h* input from the updating module 14, and the reward giving information 5*i* input from the reward giving module 15, or any other such inputs. The display processing module 20 may then output the display information (screen information) 6*a* to the display module 50 to thereby display the game screen on the display module 50.

The display module 50 may be a device that displays or may be configured to display a game screen. According to an exemplary embodiment, the display module 50 may be a liquid crystal display or similar electronic visual display. Note that, in FIG. 1, the input module 40 and the display module 50 are separately illustrated in order to explicitly indicate functions of the respective modules. However, in a case where the input module 40 is a touch panel, and the display module 50 is a liquid crystal display, for example, the two modules may be integrated into a single piece of hardware, if desired.

The storage module 30 may be a storage device constituted by any recording medium, such as a hard disk, a solid state drive (SSD), a semiconductor memory, or a digital versatile disc (DVD), for example. Storage module 30 may store the game program with which the portable terminal 100 is controllable and various types of data.

According to an exemplary embodiment, user information about one or more other users and game progress information about progress in the game made by the other users may be stored in the storage module 30 in association with each other.

Here, the "user information about other users" may not be limited to specific information as long as the user information about each of the other users indicates user information owned by each of the other users, and may include (1) identification information about each (any or all) of the other users, (2) classification information about each of the other users, (3) information about the registration date on which each of the other users performed player registration for the game, and (4) information about the last logged-in date on which each of the other users last logged in to the game, for example.

The "game progress information about progress in the game made by the other users" may not be limited to specific information, and may include any available information that is applicable to game progress. This information may include, for example, (1) information indicating the mission progress state in the game (the level of a mission that is in progress, for example), (2) information about the mission progress result in the game (the type of item and the number of items acquired, for example), and (3) information indicating a request requesting the user (player) to play the game based on the game progress information relating to the other users on behalf of the other users.

According to an exemplary embodiment, each of the "one or more other users" can be classified into at least one category among two or more categories on the basis of the classification information about each of the other users (2) above included in the "user information about the other users". A user among the "other users" may be simultaneously classified into two or more different categories.

The classification information about each user among the other users may include (1) information indicating whether the user among the other users is a "new user" for which the registration date of the user among the other users is within a predetermined period from the present time, (2) information indicating whether the user among the other users is an "inactive user" for which the last logged-in date of the user among the other users is outside of a predetermined period from the present time, and (3) information indicating whether the user among the other users is a "friend user" for which user information about the user among the other users is stored by the storing function in association with the user (player).

A user among the other users may be classified as a "new user" on the basis of the classification information (1) above on condition that, for example, the registration date of the user among the other users is within a predetermined period from the present time. The "predetermined period" can be set to any period in the game program. For example, a user among the other users for which one month or less has passed since the registration date can be classified as a new user.

A user among the other users may be classified as an "inactive user" on the basis of the classification information (2) above on condition that, for example, the last logged-in date of the user among the other users is outside of a predetermined period from the present time. The "predetermined period" can be set to any period in the game program. For example, a user among the other users for which five months or more has passed since the last logged-in date can be classified as an inactive user.

A user among the other users may be classified as a "friend user" on the basis of the classification information (3) above on condition that, for example, user information about the user among the other users (identification information about the user among the "other users", for example) is stored by the storing function in association with the user (player) (identification information about the "user (player)", for example).

Multiple classifications of users may be possible. A user among the other users may be classified into the "friend user" category on the basis of the classification information (3) as well as classified into the "new user" category on the basis of the classification information (1) or the "inactive user" category on the basis of the classification information (2).

Although a description has been given of the case where the classification information owned by each user among the other users includes (1) information indicating whether each user is a "new user", (2) information indicating whether each user is an "inactive user", and (3) information indicating whether each user is a "friend user", the classification information owned by each user among the other users may include classification information other than the above described classification information (1) to (3). Further, a user among the "other users" may be classified into two or more different categories simultaneously. This may result in them being displayed in each category.

According to one exemplary embodiment, it may be determined whether each user among the "other users" satisfies a "predetermined condition" on the basis of the game progress information relating to the user among the other users.

A "predetermined condition" in this embodiment may not be limited to a specific condition, and examples of a predetermined condition include (1) a condition that the game progress information relating to a user among the other users does not include information indicating that that user's game has reached a predetermined state or progress milestone (for example, if the game progress information relating to a user among the other users does not indicate that the user has completed a particular mission, this information may be made available), and (2) a condition that the game progress information relating to a user among the other users includes information indicating a request made by the user among the other users to the user (player) to play the game based on the game progress information relating to the user among the other users (to make the mission progress) on behalf of the user among the other users.

In the predetermined condition (1) above, the condition that "the game progress information relating to a user among the other users does not include information indicating that the game has reached a predetermined state or progress milestone" may not be limited to a specific condition as long as the condition refers to a condition where a certain mission is uncompleted, and can be set to any condition in the game program, and examples thereof include (i) a condition where a user among the other users has failed to complete a certain mission within a predetermined period and has become stuck in the middle of the mission, and (ii) a condition where a user among the other users has succeeded in completing a certain mission within the predetermined period but has failed to proceed to the next mission and has become stuck.

FIG. 6 displays an exemplary embodiment of a table illustrating the mission completion requirements for a game that requires catching a specific number of fish to complete a mission. The table displays the type and the number of fish that may be required to be caught in order to complete a mission at each level in accordance with the mission level on a step-by-step basis.

Although the details of missions that constitute the game in this embodiment are not specifically limited, the missions may be configured such that the type of fish (target fish A, B, C, D, or E) to be caught changes randomly depending on the mission, and it becomes gradually more difficult to complete each mission as the mission level increases, as illustrated in FIG. 6, for example. For example, as illustrated in FIG. 6, the target number of fish required to be caught may increase as the mission level increases; for example, mission level 1 may require a user (player) to catch three of Fish A, while mission level 2 may require a user (player) to catch five of Fish A. Alternatively, as illustrated in FIG. 6, the difficulty of catching each fish may increase; for example, missions level 1 and 3 both may require a user to catch three fish, but in mission level 1 a user may be required to catch Fish A, while in mission level 2 a user may be required to catch Fish B. The desired outcome of making it gradually more difficult to complete each mission as the mission level increases may be accomplished by making Fish B more difficult to catch.

In the missions illustrated in FIG. 6, the highest mission level may be a mission level 35, the type of target fish to be caught in each mission and the number of target fish that is required to be caught in order to complete the mission may both change as the mission level becomes higher, and the degree of difficulty may generally increase as the mission level becomes higher.

Regarding the target fish A, three target fish A may be required to be caught at a mission level 1, five may be required at a mission level 2, 12 at a mission level 6, 65 at a mission level 11, 110 at a mission level 16, 155 at a mission level 21, 220 at a mission level 26, and 295 at a mission level 31. In this way, the number of target fish A that is required to be caught in order to complete the mission may gradually increase as the mission level becomes higher, and the degree of difficulty may also increase.

Regarding the target fish B, three target fish B may be required to be caught at a mission level 3, five at a mission level 4, 20 at a mission level 7, 65 at a mission level 12, 100 at a mission level 17, 155 at a mission level 22, 220 at a mission level 27, and 295 at a mission level 32. In this way, the number of target fish B that is required to be caught in order to complete the mission may gradually increase as the mission level becomes higher, and the degree of difficulty may also increase.

Similarly, regarding the target fish C, D, or E, the number of target fish that may be required to be caught in order to complete the mission may gradually increase as the mission level becomes higher, and the degree of difficulty may also gradually increase. As a result, the game may become more challenging and more entertaining for a skilled player.

According to the exemplary embodiment of a game mission progression illustrated in FIG. 6 and provided by the game program, a user can proceed to the next mission level when the user completes each mission in order such that the user catches three "target fish A" at the mission level 1, five "target fish A" at the mission level 2, three "target fish B" at the mission level 3, five "target fish B" at the mission level 4, seven "target fish C" at a mission level 5, 12 "target fish A" at the mission level 6, 20 "target fish B" at the mission level 7, 25 "target fish C" at a mission level 8, 45 "target fish C" at a mission level 9, 25 "target fish D" at a mission level 10, and so on.

For example, at the mission level 8, a user may be required to catch 25 "target fish C" in order to proceed to the next mission (mission level 9). A user among the other users may be determined to satisfy a predetermined condition (1) in a case where (i) a predetermined period has expired immediately after the user among the other users has succeeded in catching 23 "target fish C". Alternatively, a user among the other users may be determined to satisfy a predetermined condition (1) in a case where (ii) a predetermined period has expired immediately after the user among the other users has succeeded in catching all the required 25 "target fish C" and completing the mission level 8.

In the predetermined condition (2), the condition that "the game progress information relating to a user among the other users includes information indicating a request made by the user among the other users to the user (player) to play the game based on the game progress information relating to the user among the other users (to make the mission progress) on behalf of the user among the other users" may correspond to a case where a user among the other users sends a request to the user (player) when the user among the other users has made little progress in a certain mission in order to request the user (player) to undertake the rest of the uncompleted certain mission and make the certain mission progress (play the game), for example.

According to an exemplary embodiment, one or more users among the other users which are determined to satisfy the "predetermined condition" may be regarded as "substitution-target users" for which the user (player) is to substitute and to play the game played by the one or more users, and may be displayed on the terminal apparatus of the user (player) so as to be selectable.

Further, in this embodiment, one or more users (non-substitution-target users) among the other users which are determined to not satisfy the predetermined condition can be displayed on the terminal apparatus of the user (player) so as to be distinguishable from the one or more users among the other users which are determined to satisfy the predetermined condition and so as to be selectable.

According to an exemplary embodiment, a specific "user (player)" may opt to play the game based on the game progress information relating to a substitution-target user (information indicating the mission progress state in the game, information indicating the mission progress result in the game, and so on, for example) (to make a mission progress) on behalf of the "substitution-target user" in accordance with selection information obtained from the user (player).

FIGS. 2A to 2D are exemplary embodiments of screen transition diagrams illustrating screens that correspond to a case where one or more users among the "other users" which have been determined to satisfy a predetermined condition may be displayed as substitution-target users so as to be selectable by a user (player). According to such an embodiment, a user (player) may be able to provide selection information, and any of the substitution-target users is selected in accordance with selection information from the user (player). Once a substitution-target user has been selected, the user (player) may undertake a mission uncompleted by the selected substitution-target user and may make this mission progress (for example by playing the game). The result of this action may then be shown on a screen.

Figures 2A, 2B:
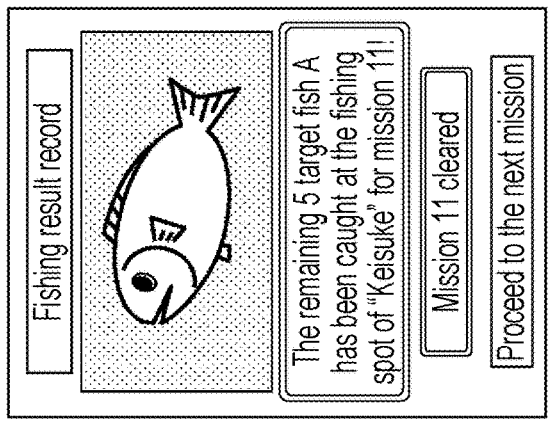
FIGS. 2A, 2B, 2c, and 2D show a series of exemplary embodiments of screen transition diagrams illustrating screens that correspond to a case where one or more users among a set of other users which are determined to satisfy a predetermined condition are displayed as substitution-target users so as to be selectable, and where any of the substitution-target users may be selected in accordance with selection information from a user (player).

FIG. 2A illustrates an example of an initial screen for displaying one or more users among the "other users" which are classified as "friend users" on the basis of the classification information (3) and which are determined to satisfy a predetermined condition as "substitution-target users" so as to be selectable.

The initial screen illustrated in FIG. 2A may be configured to provide a function for displaying areas (area A, area B, area C, and area D, for example) for a mission (fishing spots, for example) where the user (player) is currently making a mission progress. This may permit a user (player) to display and select users by area in addition to the function for displaying "substitution-target users" that may then be selectable.

When the user (player) taps a predetermined region displaying "Help friend users" in a lower part of the initial screen illustrated in FIG. 2A, one or more users among the "other users" which are "friend users" and which are determined to satisfy a predetermined condition can be displayed as "substitution-target users" so as to be selectable.

According to an exemplary embodiment, the initial screen illustrated in FIG. 2A may be configured to display one or more users among the "other users" which may be classified as "new users" on the basis of the classification information (1) and which may be determined to satisfy a predetermined condition as "substitution-target users" so as to be selectable, in accordance with the object of the game.

According to an exemplary embodiment, the initial screen illustrated in FIG. 2A may be configured to display one or more users among the "other users" which may be classified as "inactive users" on the basis of the classification information (2) and which may be determined to satisfy a predetermined condition as "substitution-target users" so as to be selectable, in accordance with the object of the game.

FIG. 2B illustrates an exemplary embodiment of a screen displaying one or more users among the "other users" which may be classified as "friend users" on the basis of the classification information (3) and which may be determined to satisfy a predetermined condition as "substitution-target users" so as to be selectable.

In FIG. 2B, for each of the "substitution-target users" that may be classified as "friend users" and that may be determined to satisfy a predetermined condition, information about those users may be displayed. For example, user information (identification information about the substitution-target user and classification information about the substitution-target user) and game progress information (information indicating the mission progress state and information indicating the mission progress result) may be illustrated.

According to an exemplary embodiment, a variety of identification information may be presented. Such identification information about each of the "substitution-target users" may include the name of each of the substitution-target users, a photograph of the face of each of the substitution-target users, or a fishing rod or other item that is owned by each of the substitution-target users and that represents the "type of game content (item)."

According to an exemplary embodiment, the embodiment involving a fishing game in which substitution-target users have fishing rods, the fishing rods illustrated in FIG. 2B may be set such that the grade of the fishing rod increases in the order of the fishing rod A, the fishing rod B, and the fishing rod C. Other fishing rods, or other items, may also be substituted.

Again referring to exemplary FIG. 2B, a display of a "substitution-target user" or plurality thereof may also include the mission progress state of each of the "substitution-target users." This may include, for example, the mission level of each of the substitution-target users. Further mission progress information may include the type and the number of target fish caught at the mission level of each of the substitution-target users, or any other such information, as desired.

According to an exemplary embodiment, and as illustrated in FIG. 2B, any user among the "substitution-target users" that is classified as a "friend user" on the basis of the classification information (3) may also satisfy other predetermined conditions; for example, they may also be classified as a "new user." Any such "friend user" that is also classified as a "new user" can be displayed in such a manner that a beginner mark is attached to the user so as to facilitate visual recognition of the user, as in the cases of the users "Keisuke" and "Tadamasa" in exemplary FIG. 2B. Other indications that a friend user is also a new user, or vice-versa, may also be contemplated.

According to an exemplary embodiment, and as illustrated in FIG. 2B, any user among the "substitution-target users" that is classified as a "friend user" on the basis of the classification information (3) may also be classified as an "inactive user." An indication that a friend user is also an inactive user can be displayed, for example, by lightly shading an item such as a fishing rod so as to facilitate visual recognition of the user. Other indications that a friend user is also an inactive user may also be contemplated.

On the screen illustrated in FIG. 2B, in addition to the "substitution-target users" that may be classified as "friend users" on the basis of the classification information (3) and that may be determined to satisfy a predetermined condition, one or more users (substitution-target users) among the "other users" that are "non-friend users" for which user information about the one or more users among the other users is stored without association with user information about the user (player) and that are determined to satisfy a predetermined condition can be displayed as "substitution-target users" so as to be selectable.

When the user (player) taps a "Non-friends" tab illustrated in FIG. 2B, for each of the "substitution-target users" that are "non-friend users", information about a plurality of non-friend users such as user information (identification information about the substitution-target user and classification information about the substitution-target user) and game progress information (information indicating the mission progress state and information indicating the mission progress result) may be displayed.

Figure 3:
FIG. 3 illustrates an exemplary embodiment of a screen on which substitution-target users that are classified as "friend users" and substitution-target users that are classified as "non-friend users" are displayed on the same screen.

Another exemplary embodiment of a "substitution-target users" screen may be illustrated in FIG. 3. This illustrates an example of a screen on which substitution-target users classified into the "friend user" category and substitution-target users classified into the "non-friend user" category may be displayed on the same screen. Other sorting arrangements may also be contemplated.

In FIG. 3, substitution-target users that are classified into the "friend user" category can be displayed in such a manner that "friend users" are emphasized so as to be visually distinguishable from "non-friend users," for example being shaded or displayed in a different color. However, other embodiments may also be contemplated.

In FIG. 3, among the "friend users" and the "non-friend users", a substitution-target user classified into the "new user" category can be displayed in such a manner that a beginner mark is attached to the user, and a substitution-target user classified into the "inactive user" category can be displayed in such a manner that the item is lightly shaded; however, the manners of display are not limited to these manners.

As illustrated in FIG. 2B and FIG. 3, according to some exemplary embodiments, for each of at least some of the substitution-target users that are classified into the "friend user" category and for each of at least some of the substitution-target users that are classified into the "non-friend user" category, user information (identification information about the substitution-target user and classification information about the substitution-target user) and game progress information (information indicating the mission progress state and information indicating the mission progress result) may be displayed so as to be viewable. A user (player) may also be able to view user information and game progress information relating to any of the substitution-target users viewable to the user (player) by performing scroll operations, or otherwise navigating the interface.

According to an exemplary embodiment, a user (player) can select a "specific substitution-target user" by using user information about each of the "substitution-target users" (identification information about the substitution-target user and classification information about the substitution-target user) and game progress information relating to each of the "substitution-target users" (information indicating the mission progress state and information indicating the mission progress result) illustrated in FIG. 2B and FIG. 3 as information for making selection, in accordance with a "specific incentive" that is set in the game program and that is given to the user (player).

According to an exemplary embodiment, a "specific incentive" may be given to a user (player) in such a manner that more reward items are given to the user (player) depending on the user that a user (player) elects to help. For example, in a case where the user (player) selects a "substitution-target user" that is classified into the "new user" category, a larger reward may be available. This may be set as desired in the game program in accordance with the object of the game and the desired level of assistance to be given to new players.

According to an exemplary embodiment, one or more users (non-substitution-target users) among the other users which are determined not to satisfy the "predetermined condition" may still be displayed so as to be distinguishable from one or more users (substitution-target users) among the other users which are determined to satisfy the "predetermined condition" and so as to be selectable.

FIGS. 4A and 4B illustrate examples of screens on which "substitution-target users" that are determined to satisfy a predetermined condition and "non-substitution-target users" that are determined to not satisfy the predetermined condition may be displayed so as to be distinguishable from each other and so as to be selectable.

According to an exemplary embodiment, and as illustrated in FIG. 4A, among the "substitution-target users", any substitution-target user that may be classified into the "friend user" category can be displayed in such a manner that the substitution-target user classified into the "friend user" is emphasized so as to be visually distinguishable from "non-friend users," which may be by any distinguishing features desired.

According to an exemplary embodiment, and as illustrated in FIG. 4A, among the "substitution-target users", any substitution-target user that is classified into the "new user" category can be displayed in such a manner that a beginner mark is attached to the substitution-target user, such as has been done with the topmost two users in the list. A substitution-target user that is classified into the "inactive user" category may also be displayed in such a manner that the item is lightly shaded. Other distinguishing features may also be added.

Turning now to FIG. 4B, FIG. 4B illustrates an exemplary embodiment of a screen on which "substitution-target users" that may be determined to satisfy a predetermined condition and "non-substitution-target users" that may be determined to not satisfy the predetermined condition may be displayed on the same screen.

According to an exemplary embodiment, and as illustrated in FIG. 4B, among the "substitution-target users" and the "non-substitution-target users", any substitution-target user that is classified into the "friend user" category can be displayed in such a manner that the substitution-target user classified into the "friend user" category is emphasized so as to be visually distinguishable from "non-friend users," for example by shading; however, the manner of display is not limited to this manner.

Further, as illustrated in FIG. 4B, among the "substitution-target users" and the "non-substitution-target users", any substitution-target user that is classified into the "new user" category can be displayed in such a manner that a beginner mark is attached to the substitution-target user, and any substitution-target user that is classified into the "inactive user" category can be displayed in such a manner that the item is lightly shaded. Other distinguishing features for these and other users may be contemplated.

According to an exemplary embodiment, and as illustrated in FIG. 2B, FIG. 3, and FIGS. 4A and 4B, a user (player) can select a specific "substitution-target user" from among the "substitution-target users" displayed so as to be selectable by tapping a predetermined region, for example a button or link, that may cause that substitution-target user to be selected. According to an exemplary embodiment, this region may be located to the right of identification information about the substitution-target user and may display "Help", allowing a user (player) to tap the region to begin helping that substitution-target user. Other locations for this region may be contemplated. This region may be provided for each of the substitution-target users, or a subset thereof, as desired.

Figures 2C, 2D:
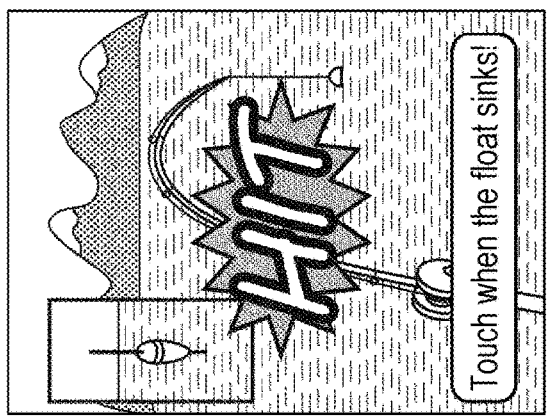

Turning now to exemplary FIG. 2C, FIG. 2C illustrates an exemplary embodiment of a screen that may appear after a user (player) has selected the "Help" option or has otherwise begun rendering assistance. Specifically, FIG. 2C displays a situation wherein a user (player) has moved to a fishing spot for a mission uncompleted by the substitution-target user selected on the screen illustrated in FIG. 2B, has undertaken the uncompleted mission, and has made the mission progress (by playing the game).

According to an exemplary embodiment, a substitution-target user, "Keisuke," has to catch 65 target fish A in order to complete the mission at the mission level 11. However, "Keisuke" has caught only 60 target fish A and has become stuck in the middle of the mission. "Keisuke" may be selected by a user from among the "substitution-target users" displayed on the screen illustrated in FIG. 2B in accordance with selection information from the user (player). According to this exemplary embodiment, by selecting "Keisuke" in this fashion, the user (player) can undertake the mission, move to the fishing spot of "Keisuke" displayed on the screen illustrated in FIG. 2C on behalf of "Keisuke", and catch the 61st target fish A and the remaining fish at the fishing spot of "Keisuke," thus allowing "Keisuke" to advance.

Turning now to exemplary FIG. 2D, FIG. 2D illustrates an exemplary embodiment of a screen on which resulting progress in the mission made by the user (player) on the screen illustrated in FIG. 2C on behalf of the selected "substitution-target user" may be displayed.

According to an exemplary embodiment, and as illustrated in FIG. 2D, a result window indicating that the user (player) has caught all of the remaining five target fish A required to complete the mission 11 at the fishing spot of "Keisuke" may be displayed once the user (player) has caught all of the remaining fish. This window may provide a predetermined region that, when activated by a user, may permit them to advance to a new mission. For example, according to the exemplary embodiment of FIG. 2D, a predetermined region displaying "Proceed to the next mission" may be provided, and if the user (player) taps this region, the user (player) can further make another mission of "Keisuke" progress.

Figure 5A:
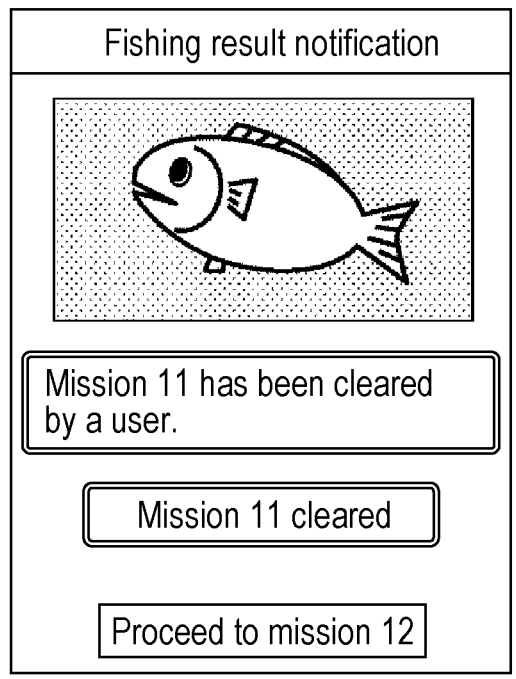
FIGS. 5A and 5B illustrate exemplary embodiments of screens that may be used to notify a substitution-target user, such as a substitution-target user who had been selected on the screen illustrated in FIG. 2B, of resulting progress made by the user (player).
Figure 5B:
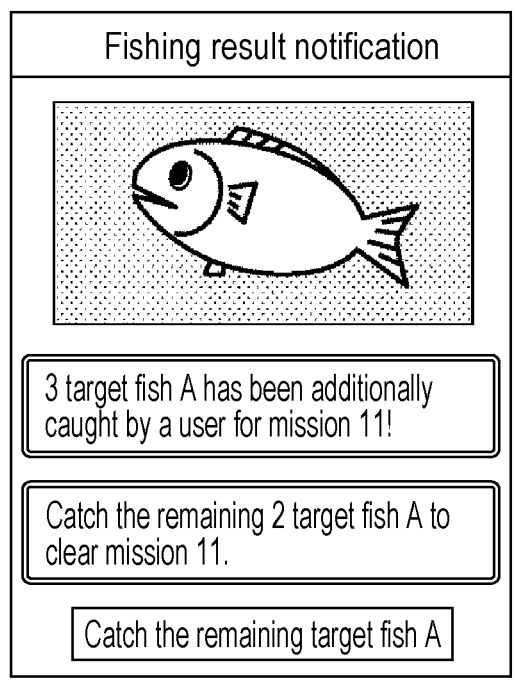

FIGS. 5A and 5B illustrate exemplary embodiments of screens that may be provided to a substitution-target user selected on the screen illustrated in FIG. 2B of progress that has been made by another user (player) in the event that any is made.

According to an exemplary embodiment, it is possible to notify a substitution-target user selected by the user (player) of resulting progress in an uncompleted mission made by the user (player). For example, if a user (player) completes some portion of the remaining mission, but does not complete all of the remaining mission, this result may optionally be provided to the substitution-target user (player).

As illustrated in FIG. 5A, in a case where the user (player) succeeds in catching all target fish A required to complete the mission 11 at the fishing spot of "Keisuke", it is possible to notify "Keisuke" that the user (player) has succeeded in completing the uncompleted mission 11. Upon being provided with this notification, "Keisuke" may be able to proceed to the next new mission by tapping a predetermined region, such as the region in FIG. 5A displaying "Proceed to mission 12".

According to an exemplary embodiment and as illustrated in FIG. 5B, in a case where the user (player) succeeds in partially completing a mission, for example catching three target fish A among the target fish A required to complete the mission 11 but failing to catch the remaining two target fish A, it is possible to notify "Keisuke" that the three target fish A are added in the target fish which is caught and that "Keisuke" is required to catch the remaining two target fish A in order to complete the mission 11. Then, "Keisuke" can make the rest of the mission progress by tapping a predetermined region displaying "Get the remaining target fish A," which may permit them to progress the mission to completion.

According to an exemplary embodiment, in a case where the user (player) renders aid to a substitution-target user based on game progress information relating to a substitution-target user (to make a mission progress), it is possible to give the user (player) a predetermined reward. The predetermined reward can vary depending on classification information about the substitution-target user (for example, information indicating whether the substitution-target user is a "new user", information indicating whether the substitution-target user is an "inactive user", and information indicating whether the substitution-target user is a "friend user").

Consequently, according to some exemplary embodiments, it may be possible to give a "specific incentive" to the user (player) and to boost the motivation of the user (player) to help another user (substitution-target user) that has made little progress in a certain mission. It may also be possible to maintain and increase the motivation of the other user (substitution-target user) to continuously play the game.

Figure 7:
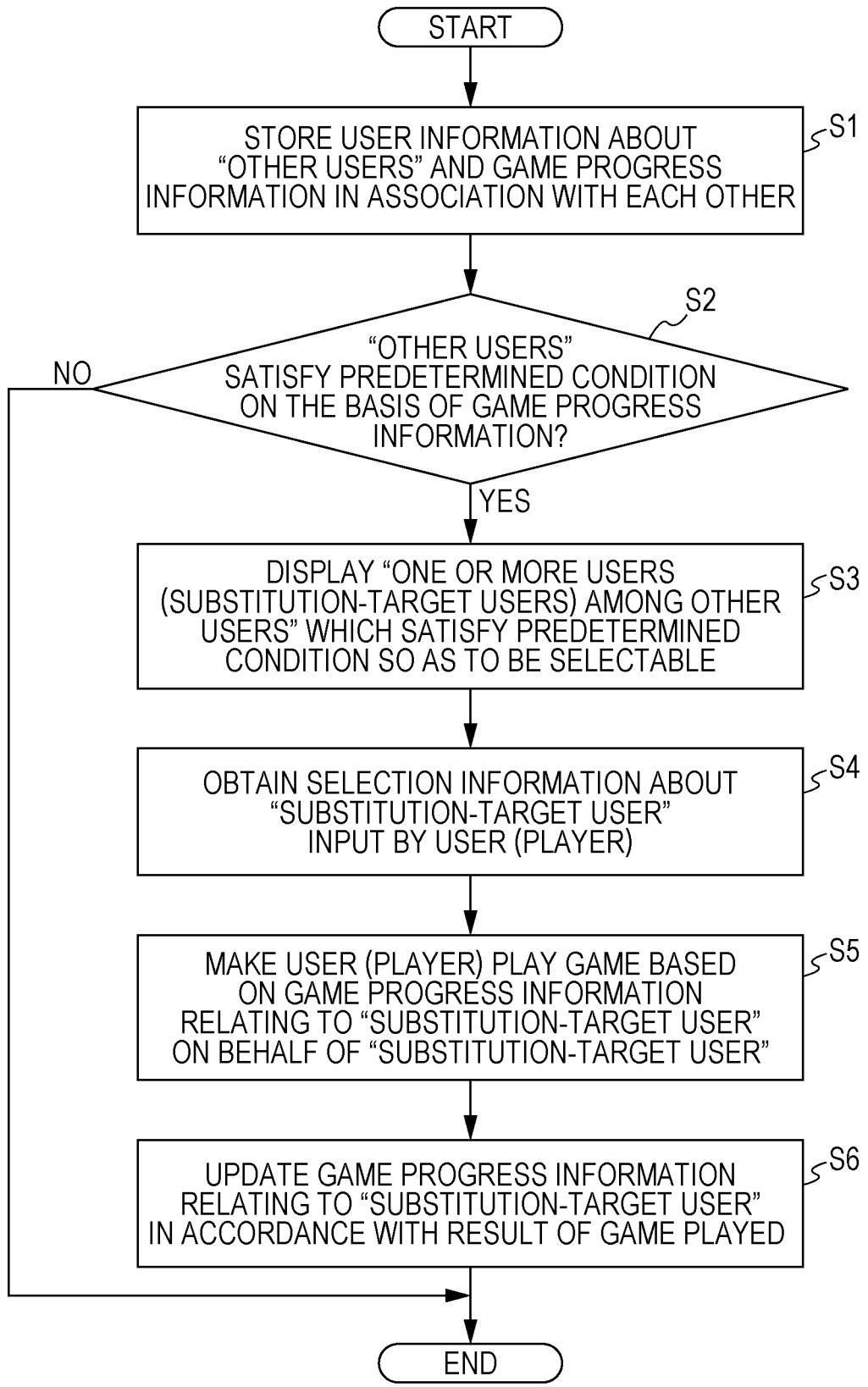
FIG. 7 is a flowchart illustrating an exemplary embodiment of a process that may be performed by a portable terminal.

According to an exemplary embodiment, a portable terminal 100 may also perform a game process. FIG. 7 is a flowchart illustrating an exemplary embodiment of a process that may be performed by a portable terminal, designated as portable terminal 100 in FIG. 1. In a description given below, steps described in parentheses are steps included in a game control method performed by the computer.

In a first step S1, or the storage step, a storage module 30 may store therein user information about one or more other users and game progress information about progress in the game made by the other users in association with each other. Second, in a determination step S2, a determination module 12 may determine whether the other users satisfy a predetermined condition on the basis of the game progress information relating to the other users. Depending on the result of the S2 step, different action may be taken. If one or more users among the other users have been determined to satisfy the predetermined condition (Yes in step S2), the method may proceed to step S3, the display step; otherwise, the method may end. According to Step S3, the display processing module 20 may output display information (screen information) that may be used to display, on the terminal apparatus of the user (player) so as to be selectable, the one or more users which have been determined by the determination module 12 to satisfy the predetermined condition as substitution-target users for which the user (player) is to substitute and to play the game played by the one or more users.

Proceeding now to step S4, the input obtaining step, an input obtaining module 11 may obtain selection information about a substitution-target user input by the user (player). In step S5, the playing step, a playing module 13 may permit a user (player) to play a game based on game progress information relating to the substitution-target user on behalf of the substitution-target user in accordance with the selection information obtained by the input obtaining module 11. In step S6, the updating step, an updating module 14 may update the game progress information relating to the substitution-target user in accordance with the result of the game played via the playing module 13.

Note that the above-described game control method may include any process performed by the modules included in the control module 10 in addition to the process described above with reference to exemplary FIG. 7.

Embodiments of the present invention are not limited to the exemplary embodiments described above and can be variously altered within the scope defined by the appended claims. Other exemplary embodiments, modified from those described above, may be contemplated.

For example, although a description has been given of the case where one user (player) helps a "user not having an advantage over others" which has made little progress in a certain mission in the above-described exemplary embodiments, such exemplary embodiments are not limited to that case.

According to an alternative exemplary embodiment, a game may be configured according to a first game configuration (game configuration (1), or "(1)"). In a case where there is just one user (player) and a plurality of "substitution-target users", the one user (player) may undertake missions respectively uncompleted by the plurality of "substitution-target users." The one user (player) may be able to progress their own missions simultaneously by undertaking missions respectively uncompleted by the plurality of "substitution-target users."

Alternatively, the game may be configured according to a second game configuration (game configuration (2) or "(2)"). In a case where there are a plurality of users (players) and one "substitution-target user", the plurality of users (players) may undertake a mission uncompleted by the one "substitution-target user" in cooperation with one another. This plurality of users may be able to progress their own missions by undertaking missions respectively uncompleted by a "substitution-target user." Further, the above-described game configurations (1) and (2) may be combined to provide various game configurations.

By providing the above-described game configurations, more opportunities for socialization among users may be created, cooperation among the users is further promoted, and a highly entertaining game can be provided.

According to another exemplary embodiment, in order to provide a highly entertaining game without compromising amusement provided by the game, it may be possible to impose various limitations on the amount or quality of help a "user not having an advantage over others" may get from the user (player). For example, an upper limit may be set on the number of times per day a "user not having an advantage over others" can get help, or an upper limit may be set on the number of times a "user not having an advantage over others" can get help in accordance with the level of a mission uncompleted by the "user not having an advantage over others".

According to an exemplary embodiment, in order to provide a highly entertaining game without compromising amusement provided by the game, the user (player) may help a "user not having an advantage over others" during a period in which the "user not having an advantage over others" is not logged in to the game.

An alternative exemplary embodiment of the present invention may be described in FIG. 8. Such an embodiment may include all of the configurations described above in alternative exemplary embodiments, as well as the features described in the following sections; previously-described alternative exemplary embodiments may likewise include all of the features described in the following sections. All definitions likewise may be applicable to all embodiments.

Exemplary FIG. 8 shows a schematic diagram illustrating an exemplary configuration of a game system 300 that includes a portable terminal 100 and a server apparatus 200. According to such an exemplary configuration, a computer may functions as the server apparatus 200, and this server apparatus may be connected to a portable terminal 100 via a certain network so as to enable communication. The game program may be executed on the server apparatus 200, or elsewhere, as desired.

The server apparatus (computer) 200 may be an information processing apparatus that may include a control module 10. As previously mentioned, according to an exemplary embodiment, control module 10 may be physically included in the portable terminal 100, and control module 10 may be configured to execute the game program relating to part or all of the process described in the first embodiment. The server apparatus 200 may store user information about one or more other users and may store game progress information about progress in the game made by the other users, in association with each other in a storage module, and may determine whether the other users satisfy a predetermined condition on the basis of the game progress information relating to the other users.

The server apparatus 200 may be configured to output display information for displaying, for example on the terminal apparatus of the user (player) so as to be selectable or on another display medium, one or more users among the other users which have been determined to satisfy the predetermined condition as substitution-target users for which the user (player) is to substitute and to play the game played by the one or more users. The server apparatus 200 may also obtain selection information about a substitution-target user input by the user (player), may pass information to and from a user (player) as that user plays the game, with that information being based in part on game progress information relating to the substitution-target user on behalf of the substitution-target user in accordance with the obtained selection information. The server apparatus may also update the game progress information relating to the substitution-target user in accordance with the result of the game played by the user (player).

The display processing module 20 that may be included in the control module 10 of the server apparatus 200 may generate the display information (screen information) 6a about a game screen with which the result of a series of processing steps can be shown to the user (player) at any time. The display processing module 20 may further transmit the display information (screen information) 6a to the portable terminal 100.

The portable terminal 100 may receive the result of a game played by the user (player) from the server apparatus 200; this may include, for example, display information (screen information) 6a. The portable terminal 100 may then display the result on the display module 50. According to an exemplary embodiment in which the result of a game played by the user is displayed via a Web browser, the portable terminal 100 can accumulate information received from the server apparatus 200 in a certain storage area, for example the Web storage area provided to the Web browser.

According to an exemplary embodiment, a configuration can be provided in which some or all of the modules (such as the control module 10) which are included in the portable terminal 100 as described in the first embodiment are included in the server apparatus 200. According to such an embodiment, the server apparatus 200 may transmit, to the portable terminal 100, a result output from the game on the basis of input provided to the portable terminal 100. Accordingly, the server apparatus 200 may perform some of the functions that would otherwise have been performed by the portable terminal 100, and may produce the same effect as if the functions had been performed by the portable terminal 100.

According to an exemplary embodiment, a game may also be a "hybrid game" wherein the server apparatus 200 and the portable terminal 100 each may perform respective portions of the process. For example, according to one exemplary embodiment, data generated by the server apparatus 200 may be used to generate a screen on which the game proceeds may be displayed. This screen may be communicated to the portable terminal 100 and displayed, for example by way of Web display. Other screens, such as a menu screen, may be displayed by a native application installed on the portable terminal 100. According to some embodiments, these screens may be displayed without requiring the portable terminal 100 to communicate with a server apparatus, that is, by way of native display.

According to an exemplary embodiment wherein the game program is implemented as a native application that is executed on the portable terminal 100, the portable terminal 100 may be permitted to access the server apparatus 200 as needed, and may download and use information relating to progress in the game. Such information may include, for example, information about the user (player), information about other players who are friends of the user (player), information about accumulated points, items, and characters offered to the user (player), and/or ranking information about the user (player). Further, multi-playing of the game is possible in which the portable terminal 100 and another portable terminal are connected to each other so as to enable communication and operate in synchronization with each other. According to an embodiment, this may be accomplished via peer-to-peer communication, for example short-range wireless communication using BLUETOOTH or a similar wireless protocol, or through another desirable method of communication.

According to an exemplary embodiment, with the game program, the portable terminal 100 (computer), and the server apparatus 200 (computer) configured to interact with each other, the user (player) may play a game, with the content of that game being based in part on game progress information relating to a user (substitution-target user) among other users who has been determined to satisfy a predetermined condition. The user (player) may play on behalf of the substitution-target user, and the game progress information relating to the substitution-target user may be updated in accordance with the result of the game played by the user (player). This may yield the effect of maintaining and increasing the motivation of the "other users" that have made little progress in the game to continuously play the game.

According to an exemplary embodiment, a method or system for performing a game may be implemented wholly or partially using software. A control block (specifically, the control module 10) of the portable terminal 100 or the server apparatus 200 may be implemented as a logic circuit (hardware) formed in an integrated circuit (IC) chip or the like or as software by using a central processing module (CPU). In the latter case, the portable terminal 100 or the server apparatus 200 may include a CPU that may execute instructions of the game program, which may be software for implementing the individual functions; a read-only memory (ROM) or a storage device (referred to as "recording medium") to which the game program and various types of data are recorded so as to be readable by a computer (or CPU); a dynamic memory such as a random access memory (RAM) to which the game program is loaded; and any other components desired. Execution of the method may require the computer (or CPU) to read the game program from the recording medium and execute the game program. The recording medium may be any "non-transitory tangible medium", such as a tape, a disc, a card, a semiconductor memory, a programmable logic circuit, or any similar device. In addition, according to an exemplary embodiment, the game program may be provided to the computer via a hardware link or via any transmission medium, for example a communication network or broadcast wave, which is capable of transmitting the game program. For example, an exemplary embodiment of the game program could be implemented as a data signal on a carrier wave where the game program is embodied by way of electronic transmission.

According to an exemplary embodiment, a game program may cause a computer (either a portable terminal 100 or a server apparatus 200, or a combination of both) to implement the input obtaining function, the determination function, the display function, the playing function, the updating function, the reward giving function, and the storage function. This may employ an input obtaining module 11, a determination module 12, a display processing module 20, a playing module 13, an updating module 14, a reward giving module 15, and the storage module 30 described above respectively. The details of the functions may be as described above.

According to an exemplary embodiment, numerous options for implementing the game program may exist. The game program can be written, for example, in a script language such as ACTIONSCRIPT or JAVASCRIPT, an object-oriented programming language such as OBJECTIVE-C or JAVA, or a markup language such as HyperText Markup Language 5 (HTML5). According to another exemplary embodiment, a game system 300 may include an information processing terminal (portable terminal 100, for example) that itself includes modules which implement some of the functions implemented by the game program, and a server (server apparatus 200, for example) that may include modules which implement the remaining functions different from those implemented by the modules of the information processing terminal.

The present invention is not limited to the embodiments described above and can be variously altered within the scope defined by the appended claims, and embodiments obtained by suitably combining technical means disclosed in different embodiments are also within the technical scope of the present invention. Further, a new technical feature can be formed by combining technical means disclosed in different embodiments.

Embodiments of the present invention may be applicable to a wide variety of computers, such as smartphones, tablet terminals, portable telephones, home video game machines, personal computers, server apparatuses, workstations, or mainframes.

What is claimed is:

1. A computer-implemented method for operating a computer game, the method comprising:
    identifying a playing user and one or more other users;
    storing, in a storage module, user information about the one or more other users and game progress information about progress in a game made by the one or more other users in association with each other;
    determining, using a processor, whether any of the one or more other users satisfy a condition on the basis of the game progress information relating to the one or more other users;
    identifying, using the processor, any of the one or more other users that satisfy the condition as substitution-target users;
    displaying, on a terminal apparatus of the playing user, one or more of the substitution-target users;
    obtaining user input from the playing user indicating a selection of at least one substitution-target user from the one or more substitution-target users previously identified with the processor;
    initiating a game to be played by the playing user, wherein initiating the game comprises identifying a mission available to be played by the selected at least one substitution-target user to which the game progress information relating to the at least one substitution-target user corresponds, retrieving said mission from the storage module, and initiating said mission, the step of initiating the game to be played by the playing user comprising determining the mission to which the game progress information relating to the at least one substitution-target user corresponds, and initiating said mission on the terminal apparatus of the playing user on the basis of the determination;
    obtaining a result of the game played by the playing user using the user information and game progress information of the playing user and on behalf of the at least one substitution-target user; and
    updating the game progress information of the at least one substitution-target user in accordance with the result of the game played by the playing user.

2. The computer-implemented method of claim 1, wherein the condition is a condition that the game progress information of a particular user among the one or more users does not include information indicating that the game played by the particular user has reached a progress milestone.

3. The computer-implemented method of claim 1, wherein the condition is that the game progress information of a particular user among the one or more users includes information indicating a request made by the particular user among the one or more users to the playing user to play the game based on the game progress information of the particular user.

4. The computer-implemented method of claim 1, wherein the method further comprises, following the steps of initiating the game to be played by the playing user and obtaining the result of the game played by the playing user, the step of:
    giving a reward to the playing user.

5. The computer-implemented method of claim 4, wherein the user information about the one or more other users comprises classification information about the one or more other users, and wherein the reward provided to the playing user is varied in accordance with the classification information about the substitution-target user.

6. The computer-implemented method of claim 5, wherein the user information about each user among the one or more other users comprises information about a registration date on which the user among the one or more other users performed player registration for the game, and
    wherein the classification information about each user among the one or more other users comprises information indicating whether the user among the other users is a new user, based on a determination of whether the registration date of the user among the other users is within a certain period of time from the present time.

7. The computer-implemented method of claim 5, wherein the user information about each user among the one or more other users includes information about a last logged-in date on which the user among the other users last logged in to the game, and
    wherein the classification information about each user among the one or more other users includes information indicating whether the user among the other users is an inactive user, based on a determination of whether the last logged-in date of the user among the other users is outside of a certain period of time from the present time.

8. The computer-implemented method of claim 5, wherein the classification information about each user among the one or more other users includes information indicating whether the user among the one or more other users is a friend user, wherein the user information about the friend user is stored in the storage module in association with the playing user.

9. The computer-implemented method of claim 1, further comprising displaying, on the terminal apparatus of the playing user, a set of users comprising both one or more non-substitution-target users who have not satisfied the condition and one or more of the substitution-target users who have satisfied the condition, wherein the one or more non-substitution-target users are displayed in a form that is distinguishable from a display of the one or more substitution-target users, wherein the one or more substitution-target users are selectable and wherein the one or more non-substitution-target users are nonselectable.

10. A computer program product embodied on a non-transitory computer-readable medium, comprising code executable by a computer having a processor and a memory and arranged to operate a game, to cause the computer to carry out the following steps:
    identifying a playing user and one or more other users;
    storing, in a storage module, user information about the one or more other users and game progress information about progress in the game made by the one or more other users in association with each other;
    determining, using the processor, whether any of the one or more other users satisfy a condition on the basis of the game progress information relating to the one or more other users;
    identifying, using the processor, any of the one or more other users that satisfy the condition as substitution-target users;
    displaying, on a terminal apparatus of the playing user, one or more of the substitution-target users;

obtaining user input from the playing user indicating a selection of at least one substitution-target user from the one or more substitution-target users previously identified with the processor;

initiating a game to be played by the playing user, wherein initiating the game comprises identifying a mission available to be played by the selected at least one substitution-target user to which the game progress information relating to the at least one substitution-target user corresponds, retrieving said mission from the storage module, and initiating said mission, the step of initiating the game to be played by the playing user comprising determining the mission to which the game progress information relating to the at least one substitution-target user corresponds, and initiating said mission on the terminal apparatus of the playing user on the basis of the determination;

obtaining a result of the game played by the playing user using the user information and game progress information of the playing user and on behalf of the at least one substitution-target user; and updating the game progress information of the at least one substitution-target user in accordance with the result of the game played by the playing user.

11. The computer program product of claim 10, wherein the condition is a condition that the game progress information of a particular user among the one or more users does not include information indicating that the game played by the particular user has reached a progress milestone.

12. The computer program product of claim 10, wherein the condition is that the game progress information of a particular user among the one or more users includes information indicating a request made by the particular user among the one or more users to the playing user to play the game based on the game progress information of the particular user.

13. The computer program product of claim 10, wherein the code executable by the computer arranged to operate the game further comprises executing a step of giving a reward to the playing user, and wherein the step of giving the reward to the playing user is executed following the steps of initiating the game to be played by the playing user and obtaining the result of the game played by the playing user.

14. The computer program product of claim 13, wherein the user information about the one or more other users comprises classification information about the one or more other users, and wherein the reward provided to the playing user is varied in accordance with the classification information about the substitution-target user.

15. The computer program product of claim 14, wherein the user information about each user among the one or more other users comprises information about a registration date on which the user among the one or more other users performed player registration for the game, and wherein the classification information about each user among the one or more other users comprises information indicating whether the user among the other users is a new user, based on a determination of whether the registration date of the user among the other users is within a certain period of time from the present time.

16. The computer program product of claim 14, wherein the user information about each user among the one or more other users includes information about a last logged-in date on which the user among the other users last logged in to the game, and wherein the classification information about each user among the one or more other users includes information indicating whether the user among the other users is an inactive user, based on a determination of whether the last logged-in date of the user among the other users is outside of a certain period of time from the present time.

17. The computer program product of claim 14, wherein the classification information about each user among the one or more other users includes information indicating whether the user among the one or more other users is a friend user, wherein the user information about the friend user is stored in the storage module in association with the playing user.

18. The computer program product of claim 10, further comprising displaying, on the terminal apparatus of the playing user, a set of users comprising both one or more non-substitution-target users who have not satisfied the condition and one or more of the substitution-target users who have satisfied the condition, wherein the one or more non-substitution-target users are displayed in a form that is distinguishable from a display of the one or more substitution-target users, wherein the one or more substitution-target users are selectable and wherein the one or more non-substitution-target users are nonselectable.

19. A terminal apparatus configured to operate a computer game, the terminal apparatus having a graphical user interface, a processor, and a memory, and being associated with a playing user, whereby the terminal apparatus is configured to perform the steps of:

retrieving, from a server device, a set of one or more other users, the set of one or more users including one or more substitution-target users, whereby the server device is configured to identify the one or more substitution-target users in the set of one or more other users on the basis of whether each of the one or more other users satisfies a condition on the basis of game progress information;

displaying, on the graphical user interface of the playing user, the one or more substitution-target users;

receiving, from the playing user, via the graphical user interface, a selection of at least one selected substitution-target user from the one or more substitution-target users;

initiating a game to be played by the playing user on behalf of the at least one selected substitution-target user, wherein initiating the game comprises identifying a mission available to be played by the at least one selected substitution-target user to which the game progress information relating to the at least one selected substitution-target user corresponds, retrieving said mission from the storage module, and initiating said mission, the step of initiating the game to be played by the playing user comprising determining the mission to which the game progress information relating to the at least one selected substitution-target user corresponds, and initiating said mission on the graphical user interface of the playing user on the basis of the determination;

resolving a result of the game played by the playing user using the user information and game progress information of the playing user and on behalf of the at least one selected substitution-target user; and updating the game progress information of the at least one selected substitution-target user in accordance with the result of the game played by the playing user.

20. The terminal apparatus of claim 19, wherein the terminal apparatus is further configured to give a reward to the playing user following the playing user playing the game on behalf of the at least one selected substitution-target user and resolving the result of said game.

* * * * *